March 11, 1930.  W. E. WHIPP  1,750,555
GEARED HEADSTOCK FOR LATHES
Filed May 21, 1928  2 Sheets-Sheet 1

INVENTOR,
Wendell E. Whipp,
BY Howard S. Smith,
His ATTORNEY.

March 11, 1930.  W. E. WHIPP  1,750,555
GEARED HEADSTOCK FOR LATHES
Filed May 21, 1928   2 Sheets-Sheet 2

INVENTOR,
Wendell E. Whipp,
BY Howard S. Smith,
His ATTORNEY.

Patented Mar. 11, 1930

1,750,555

UNITED STATES PATENT OFFICE

WENDELL E. WHIPP, OF SIDNEY, OHIO, ASSIGNOR TO THE MONARCH MACHINE TOOL COMPANY, OF SIDNEY, OHIO, A CORPORATION OF OHIO

GEARED HEADSTOCK FOR LATHES

Application filed May 21, 1928. Serial No. 279,383.

This invention relates to new and useful improvements in geared headstocks for lathes.

It is the principal object of my invention to provide for the headstock of a lathe, a non-clashing change-speed mechanism by which a large number of speeds, for example, sixteen are obtained with a less number of gears, in the present instance, fourteen. All of the spindle speeds are selective and the changes are made while the lathe is in operation, the gears being constantly in mesh and preferably of the helical type so that they may run noiselessly and smoothly. Noise, friction and shock, and gear tooth marks on the work, are thus eliminated, while a constant transmission of power is achieved.

All changes of spindle speeds are made by a small number of levers, in this instance four, which move double-sided heavy jaw-clutches along multiple integral portions of the spindle and intermediate shafts into locking engagement with the gears in the oil tight headstock, no gears being carried in the cover plate.

The advantage of sixteen speeds for the spindle over a less number of speeds is that the operator will have available a more nearly correct spindle speed at which to operate the lathe. Furthermore, with sixteen speeds a more perfect progression of speeds results with a smaller gap between each speed. These results are also accomplished without interlocking devices in the head, thus avoiding complications and unnecessary expense.

Other important and incidental objects will be brought out in the following specification and particularly set forth in the subjoined claims.

Figure 1:
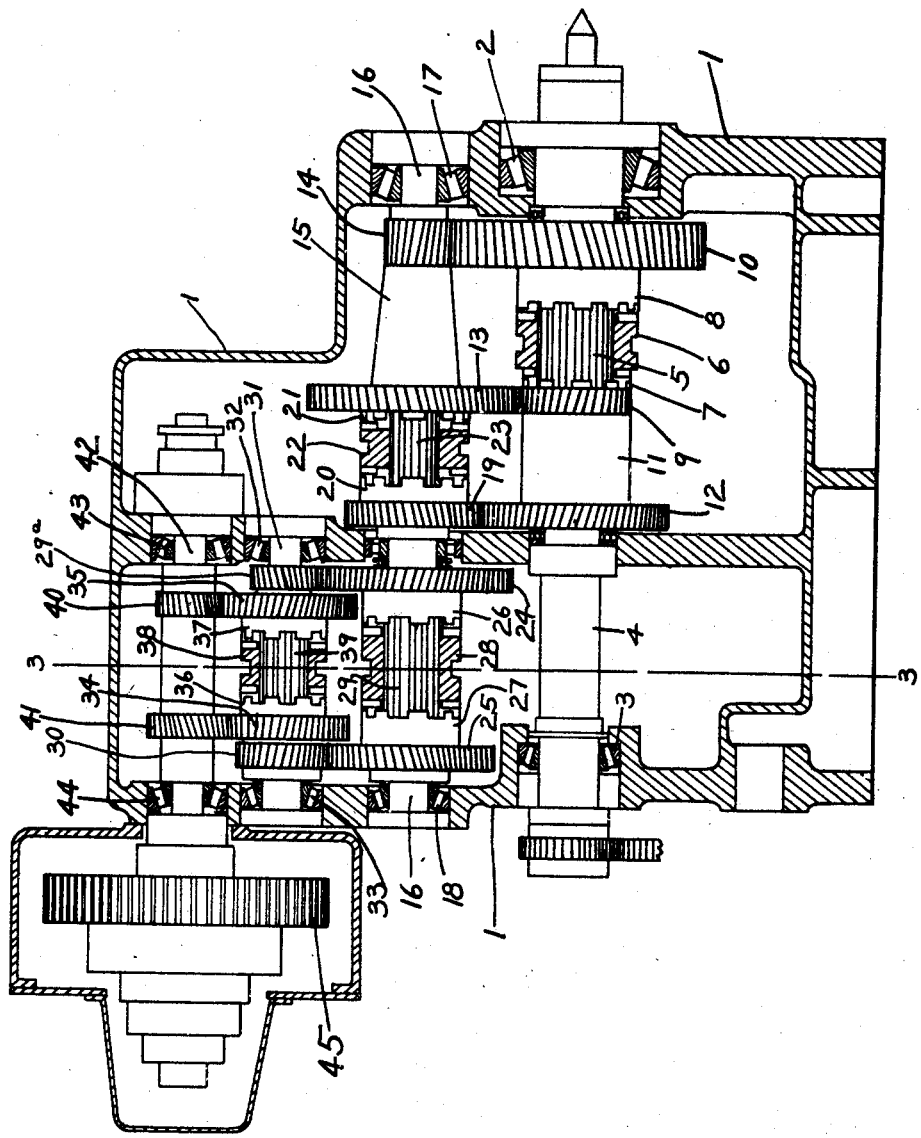
Figure 2:
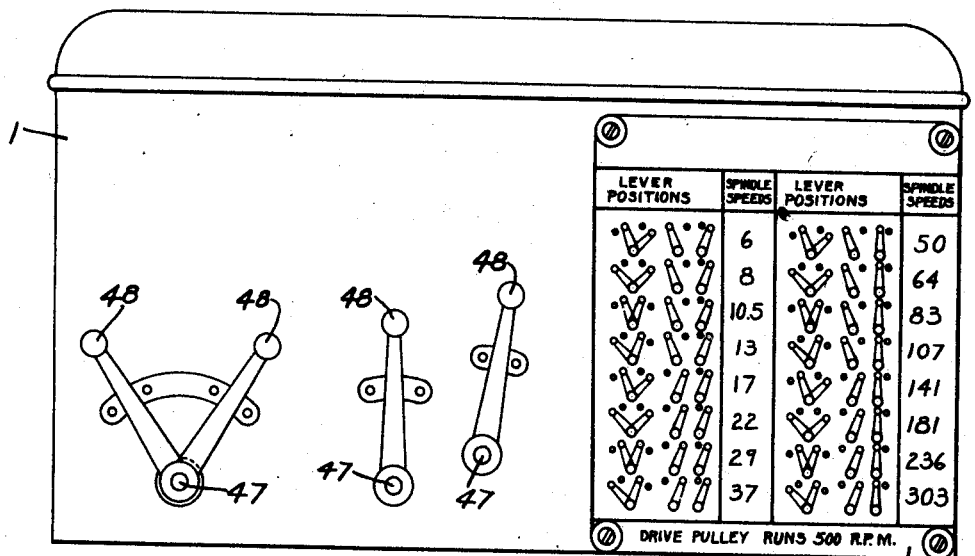
Figure 3:
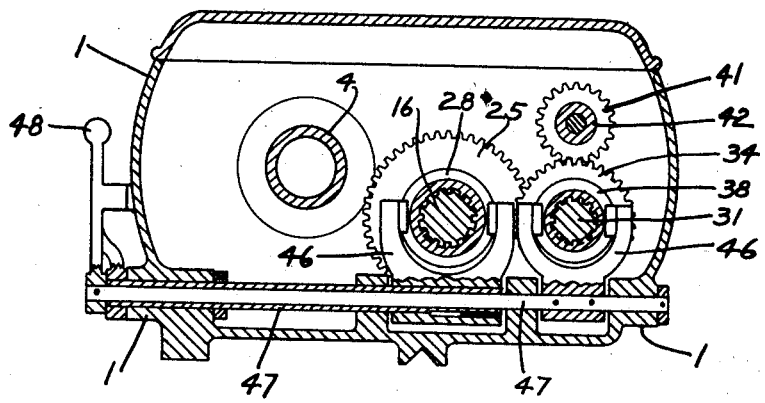

In the accompanying drawings illustrating my invention, Figure 1 is a longitudinal, sectional view taken through my improved headstock. Figure 2 is a side view thereof, showing the change speed control levers. And Figure 3 is a cross sectional view taken on the line 3—3 of Figure 1.

In the accompanying drawings, the numeral 1 designates a headstock casing which is preferably of the bowl type to give exceptional strength and rigidity. Within the headstock casing there are provided roller bearings 2 and 3 for a spindle 4 of the usual engine lathe type.

Splined to the spindle 4 by means of multiple integral keys 5 thereon, is a clutch member 6 of the double jaw type. This clutch member is adapted to clutch the spindle to either one of two clutch members 7 and 8 secured to gears 9 and 10 respectively that are preferably of the helical type. These gears are journaled for a free movement on the spindle.

The gear 9 is preferably an integral part of a sleeve 11 on which there is a larger gear 12 that is also preferably of the helical type. When the clutch member 6 is moved to the right in Figure 1, the spindle 4 will be driven from the gear 10; but when moved to the left, the spindle will be driven from either the gear 9 or the gear 12.

The gear 9 is in mesh with a gear 13, while the gear 10 is in engagement with a gear 14. The gears 13 and 14, which are preferably of the helical type, are rigidly secured to, or are a part of, a sleeve 15 free to turn on a shaft 16 journaled in roller bearings 17 and 18 within the headstock casing 1.

The gear 12 on the spindle 4 is in mesh with a gear 19, preferably of the helical type, free to rotate on the shaft 16, which will be known as the second intermediate shaft.

The gear 19 is provided with a clutch member 20, and the sleeve 15 with a clutch member 21. The clutch members 20 and 21 are in operative relation with a double jaw clutch member 22 on multiple integral keys 23 on the shaft 16. (See Figure 1.)

The second intermediate shaft 16 is driven by means of either one of two gears 24 and 25, preferably of the helical type and journaled for a free movement on said shaft. These gears 24 and 25 carry clutch members 26 and 27 respectively, which are in operative relation with a double jaw clutch member 28, slidable on multiple integral keys 29 on the shaft 16.

The gears 24 and 25 are in mesh with gears 29ª and 30 respectively, preferably of the helical type, which are fixedly secured to a first intermediate shaft 31 journaled in roller bearings 32 and 33 within the headstock casing 1.

Loosely mounted on the shaft 31 are gears 34 and 35 which are preferably of the helical type. These gears 34 and 35 carry clutch members 36 and 37 respectively, which are in operative relation with a double jaw clutch member 38 that is free to slide axially on multiple integral keys 39 on the shaft 31.

The gears 34 and 35 are in mesh with gears 40 and 41, preferably of the helical type, which are fixedly secured on an initial driving shaft 42 journaled in roller bearings 43 and 44 in the headstock casing 1. Fixed on one end of this shaft 42 is a sprocket 45 adapted to receive a sprocket chain (not shown) for the purpose of driving said shaft.

All of the gears within the casing 1 are of diameters suitable to produce the desired speeds of the spindle when the various combinations of the gears are set up by shifting the various clutches. I prefer helical gears for the constant smooth rolling action which they insure and their elimination of noise, vibration and shocks.

The double jaw clutch members 6, 22, 28 and 32 are shifted by yokes 46 mounted on rock shafts 47 journaled in the casing 1. These rock shafts project out of the casing 1 a sufficient distance to receive on their front ends hand levers 48 which, being at the front of the casing, are easily accessible for operation. (See Figures 2 and 3.) By shifting these hand levers to the right or to the left, various combinations may be set to effect different speeds of the spindle—in this instance sixteen as indicated on the diagram or index plate 49 secured to the front of the casing.

For example, when the levers 48 are moved to occupy the first row of lever positions on the left side of the diagram plate 49, speed #1, which is 6 R. P. M. for the spindle, will be obtained. For this speed the drive is from the gear 40 to the gear 35, through the clutch 38 to the gear 29ª, from the gear 29ª to the gear 24, through said gear 24 to the clutch 28, and through the clutch 22 to the gear 19, through the gear 19 to the gear 12, through the gear 9 to the gear 13, and through the gear 14 to the gear 10, and through the gear 10 to the clutch 6 splined on the spindle 4.

For speed #10, or 64 R. P. M. of the spindle, the drive is through gear 41 to the gear 34, through the latter gear to the clutch 38, through the gear 29ª to the gear 24, through the gear 24 to the clutch 28, through the clutch 22 to the gear 19, through the gear 19 to the gear 12, through the gear 9 to the clutch 6, and through the clutch 6 to the spindle 4 on which it is splined.

To obtain speed #16, or 303 R. P. M., the drive is through gear 41 to gear 34, through the latter gear to the clutch 38, through gear 30 to gear 25, through gear 25 to clutch 28, through clutch 22 to gear 13, through gear 13 to gear 9, through gear 9 to clutch 6 and through clutch 6 to the spindle 4 on which it is splined.

Since all the gears are constantly in mesh, any one of sixteen spindle speeds shown on the diagram plate 49 may be easily obtained while the lathe is in operation, by moving the levers 48 to the positions indicated for the desired speed. These levers will then shift the double jaw clutches into engagement with the gears necessary to give that speed, without gear clashing or other noises that are usually incident to the changing of gear ratios.

By providing a different speed ratio to the various gear combinations, any spindle speed can be obtained with the initial drive shaft running at a constant speed. For instance, with the initial driving shaft running at 500 R. P. M., I can increase or decrease the spindle speeds by adding teeth to, and taking them from, the various gears.

Having described my invention, I claim:

1. A geared headstock for lathes, comprising an initial driving shaft, a first intermediate shaft, a second intermediate shaft and a spindle, gears fixed on the initial driving shaft, gears loosely mounted on the first intermediate shaft in mesh with the fixed gears, a clutch splined on the first intermediate shaft between the loose gears thereon and free to be moved in operative relation with either one of them, fixed gears on the first intermediate shaft, four loose gears on the second intermediate shaft, the first and second of said gears being in mesh with the fixed gears on the first intermediate shaft, a clutch splined on the second intermediate shaft between the first and second loose gears thereon and free to be moved into engagement with either one of them, loose gears on the spindle in mesh with the third and fourth loose gears on the second intermediate shaft, a clutch splined on the second intermediate shaft between the third and fourth gears thereon and free to be moved into engagement with either one of them, and a clutch splined to the spindle for the purpose specified.

2. A geared headstock for lathes, comprising an initial driving shaft, a first intermediate shaft, a second intermediate shaft, and a spindle, two gears spaced a short distance apart, fixedly secured on the initial driving shaft, two gears loosely mounted on the first intermediate shaft in mesh with the initial gears, a clutch splined on the first intermediate shaft between the two loose gears thereon and free to be moved into operative relation with either one of said gears, two gears fixedly mounted on the first intermediate shaft, a pair of gears loosely mounted on the second intermediate shaft in mesh with the fixed gears on the first intermediate shaft, a clutch splined on the second intermediate shaft between the two loose gears on the latter and free to be moved into operative relation with either one of said gears, a third and a fourth gear also loosely mounted on the second intermediate shaft, a clutch splined on the second intermediate shaft between the third and fourth gears thereon and free to be moved into engagement with either one of them, a fifth gear fixedly secured to the fourth gear on the second intermediate shaft, a pair of connected gears loosely mounted on the spindle in mesh with the third and fourth gears on the second intermediate shaft, a third gear loosely mounted on the spindle in mesh with the fifth gear on the second intermediate shaft, and a clutch splined on the spindle between the second and third gears on the latter, for the purpose specified.

3. A geared headstock for lathes, comprising an initial driving shaft, a first intermediate shaft, a second intermediate shaft and a spindle, gears fixed on the initial driving shaft, gears loosely mounted on the first intermediate shaft in mesh with the fixed gears, fixed gears on the last named shaft, loose gears on the second intermediate shaft, two of said gears being in mesh with the fixed gears on the first intermediate shaft, loose gears on the spindle in mesh with some of the loose gears on the second intermediate shaft, clutches splined on the first and second intermediate shafts and the spindle, free to be moved into operative relation with the selected gears thereon to provide different gear ratios between the initial driving shaft and the spindle, and a four lever control for said clutches.

In witness whereof I have hereunto set my hand this 12 day of May, 1928.

WENDELL E. WHIPP.